United States Patent [19]

Butsch

[11] 4,096,537

[45] Jun. 20, 1978

[54] LEAD SCREW SUPPORT FOR A DISC RECORDER

[75] Inventor: Otto R. Butsch, Ann Arbor, Mich.

[73] Assignee: Sycor, Inc., Ann Arbor, Mich.

[21] Appl. No.: 778,144

[22] Filed: Mar. 16, 1977

[51] Int. Cl.² .................. G11B 21/08; G01N 1/00; G01B 5/30; G01B 7/16
[52] U.S. Cl. .................. 360/106; 74/89.15; 74/424.8 R
[58] Field of Search ............ 360/106, 78; 74/89.15, 74/424.8 R

[56] References Cited

U.S. PATENT DOCUMENTS 4,030,137  6/1977  Dalziel .................. 360/106

*Primary Examiner*—Robert S. Tupper

*Attorney, Agent, or Firm*—Price, Heneveld, Huizenga & Cooper

[57] ABSTRACT

An improved lead screw drive for a disc recorder of the type including a rigid frame having a pair of spaced, parallel members. The parallel members define coaxially aligned bores. A stepper motor having an outwardly-projecting integral lead screw output shaft is supported on the frame with the lead screw extending through one of the bores to a point closely adjacent the other bore. A rotatable support is disposed in the other bore and contacts the free end of the lead screw opposite the motor. The support includes a holder having a mounting shaft extending into the bore. A conical member is rotatedly supported by the holder and contacts a seat at the free end of the lead screw. The conical member is biased against the free end of the lead screw to thereby rotatably support same.

11 Claims, 7 Drawing Figures

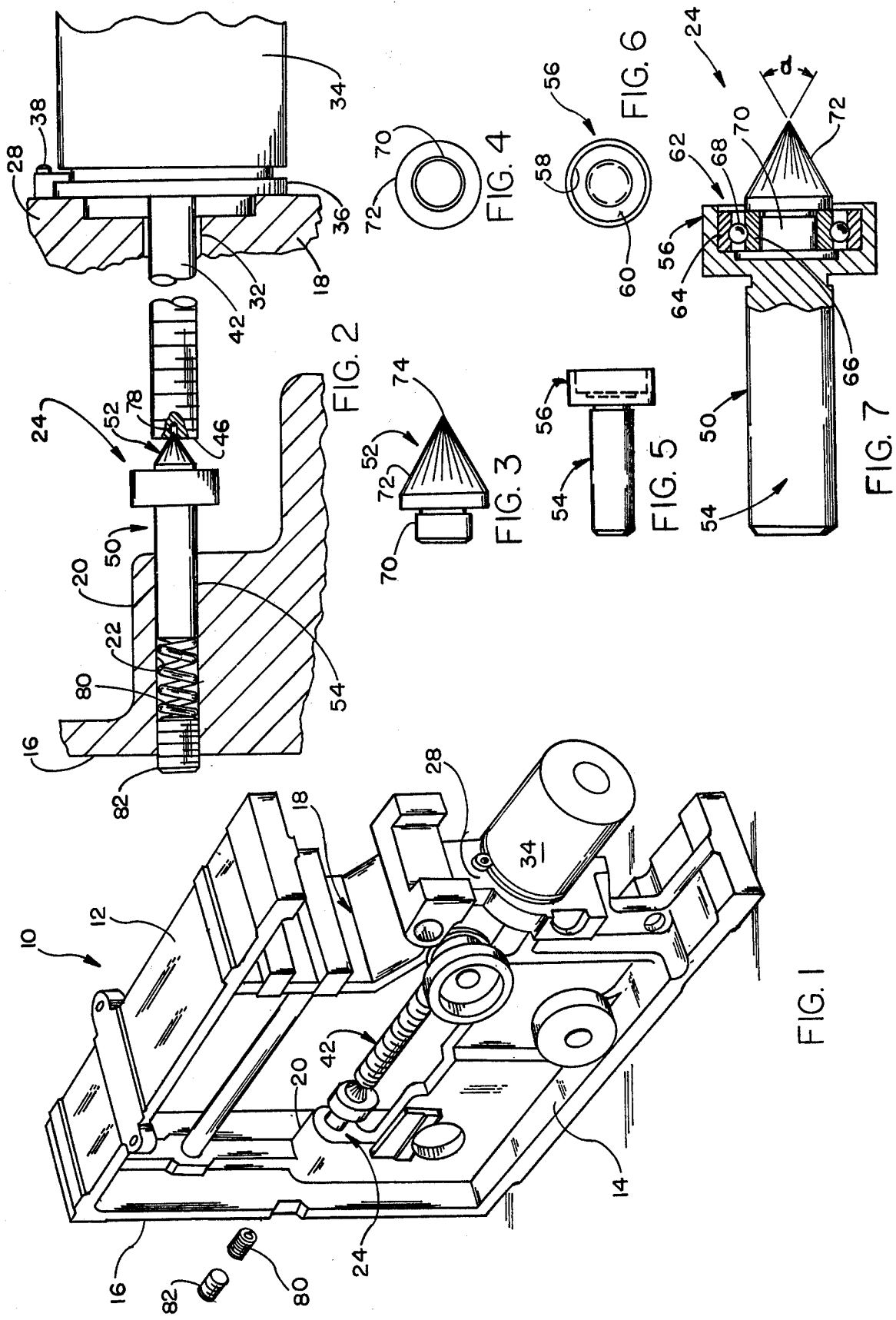

LEAD SCREW SUPPORT FOR A DISC RECORDER

BACKGROUND OF THE INVENTION

This invention relates to data recorder/reproducer devices, and particularly those of the type having a rotatable shaft for moving the transducing head or heads along the recording media, as in a disc recorder, particularly of the type using a thin, flexible disc and including one or more movable heads. More particularly still, the present invention relates to a unique lead screw drive for translating the head or heads of such a data recorder/reproducer device.

Various forms of data recorder/reproducer devices for disc media are presently available. Some of these devices store and reproduce information on thin, flexible discs. The discs for such recorders are typically made by coating both sides of a thin, "floppy," sheet of polymeric film or other plastic material with a magnetic oxide. The disc is then permanently enclosed within a protective, sleeve-like envelope within which the disc may be rotated. The recorder typically includes means for supporting and rotating one or more discs, and includes one or more heads or transducers movable across the disc for storage or retrieval purposes. An example of one such recorder may be found in commonly-owned U.S. Pat. No. 3,913,137 to Morgan, entitled TWIN FLEXIBLE DISC RECORDER WITH MOVABLE HEADS and issued on Oct. 14, 1975.

As disclosed therein, this device includes a frame supporting a long worm shaft or lead screw, adapted for translating a pair of transducers or heads. The frame defines a pair of spaced, coaxial support points at which are disposed bearings. The ends of the lead screw are supported by the bearings and the lead screw is coupled to a drive motor or stepper motor through a flexible, bellows-type coupling. This lead screw drive forms the subject matter of commonly-owned U.S. Pat. application, Ser. No. 655,970, filed Feb. 6, 1976 and entitled DISC RECORDER WITH LEAD SCREW DRIVE. With this arrangement, the lead screw is supported independently of the stepper motor and the universal drive coupling is employed to compensate for alignment and position variations. Since the lead screw drive translates the input/output transducers of the recorder across the disc media, moving from track to track and stopping to accurately position the transducers at selected recording tracks, the alignment, positioning and accuracy of the lead screw drive are critical to proper operation, a fact made evident by considering that typical radial track density is on the order of 48 tracks per inch. Thus, it is extremely important that the lead screw not shift or change position or alignment with respect to the frame during operation. As a result, it is regarded by many to be necessary to support both ends of the lead screw independently of the stepper or drive motor to achieve such accuracy in positioning.

SUMMARY OF THE INVENTION

In accordance with the present invention, a unique lead screw drive for a disc recorder is provided whereby accurate positioning of the lead screw is obtained with the lead screw being integral with the output shaft of the stepper motor. Essentially, the improved lead screw drive includes a rigid frame having a pair of spaced, parallel members, each defining spaced, coaxially aligned bores. A stepper motor having an integral lead screw is secured to one of the members and the lead screw extends through the bore towards the other bore. A support means is disposed within the other bore and contacts the free or cantilevered end of the lead screw for supporting the lead screw. The support means is biased into engagement with the free end of the lead screw and includes a rotatably supported, conical member, the tip or apex of which engages a conical seat at the free end of the lead screw.

BRIEF DESCRIPTION OF THE DRAWINGS

FIG. 1 is a perspective view showing the frame of a disc recorder and the lead screw drive in accordance with the present invention;

FIG. 2 is an enlarged fragmentary, partially sectioned, side elevational view of the lead screw drive in accordance with the present invention;

FIG. 3 is a side elevational view of the conical member incorporated in the lead screw drive of FIGS. 1 and 2;

FIG. 4 is a rear elevational view of the conical member of FIG. 3;

FIG. 5 is a side elevational view of a holder incorporated in the drive support of FIGS. 1 and 2;

FIG. 6 is a right side elevational view of the holder of FIG. 5; and

FIG. 7 is an enlarged, partially sectioned, elevational view of the assembled holder and conical member.

DETAILED DESCRIPTION OF THE PREFERRED EMBODIMENT

A portion of a recorder/reproducer apparatus incorporating the lead screw drive in accordance with the present invention is illustrated in FIG. 1. As shown therein, the recorder includes a frame 10 of generally rectangular configuration including spaced, top and bottom members 12, 14 and spaced, side members 16, 18. The frame 10 is a rigid structure upon which the various operative portions of the recorder are mounted. Since these portions of the recorder form no part of the present invention, they have not been illustrated. Spaced side member 16 includes a boss 20 defining a bore 22 (FIG. 2) within which is disposed a support means 24. Side member 18 is formed with a boss structure defining a motor mount 28. As best seen in FIG. 2, the boss or motor mount portion 28 defines a bore of stepped cross section. The bore includes a first portion 30 having a diameter greater than a second portion 32. The bores 22 and 32 are spaced from one another and coaxially aligned with respect to each other.

Secured to the frame member 18 at the mount portion 28 is a conventional stepper motor 34. The stepper motor 34 is positioned coaxially with the bores 30, 32 and secured to the side member 18 by suitable clips 36 and fasteners 38. The stepper motor 34 has an elongated output shaft or integral lead screw 42 which is threaded along substantially its entire length. The output shaft 42 serves as the worm drive or lead screw for the disc recorder. The lead screw drive in accordance with the present invention, therefore, employs a stepper motor having an integral lead screw, or a lead screw that is integral with the output shaft of the stepper motor. When the motor 34 is secured to the frame side member 18, the lead screw 42 extends through the bores 30, 32 and through much of the space between the side members 16, 18 but terminates short of opposite frame member 16 at a point spaced from and generally coaxial with the bore 22 of the boss 20. The free, or cantilevered ends 46 of the lead screw 42 is supported by the support means 24. As best seen in FIGS. 2 and 7, the support means 24 includes a holder 50 and a rotating, conically shaped member or live center 52. The holder 50 also includes an elongated, shaft-like mounting portion 54 dimensioned to slidably fit within the bore 22 of the boss 20. One end of the mounting portion 54, as seen in FIGS. 5, 6 and 7, is provided with a cup-like portion or hub 56 opening towards bore 32. The cup-like portion 56 is generally cylindrical in shape and includes an inner peripheral wall 58 and a stepped bottom 60. The cup-like or hub portion 56 of the holder 50 is dimensioned to receive, in a press-fit fashion, a bearing assembly 62. As seen in FIG. 7, the bearing assembly 62 includes an outer race 64, an inner race 66 and interposed bearings 68. The live center 52 includes a hub portion 70 and a conical portion 72 which terminates in a sharp point or apex 74. In the presently preferred embodiment, the conical portion 72 of the live center has an included angle "a" (FIG. 7) of 60°. Further, the sharp point, tip or apex 74 preferably has a maximum diameter of 0.030 inches. The hub portion 70 of the live center 52 is press-fit within the inner race 66 of the bearing assembly 62 (FIG. 7). The bearing assembly 62 is in turn press-fit within the cup or hub 56. As a result, the live center 52 is freely rotatable with respect to the holder 50. As seen in FIG. 2, the shaft portion 54, which in the preferred form is cylindrical and of circular cross section, is slidably inserted within the bore 22 of the boss 20. The tip 74 of the live center 52 engages a countersink conical seat 78 formed in the free end 46 of lead screw 42. The conical seat 78 includes a countersink bore portion 79 and is coaxially positioned relative to the longitudinal center line of the lead screw 42.

Means are provided for biasing the support 24 against the lead screw 42 to thereby spring-load the lead screw 42 towards the stepper motor 34 (i.e., towards the right as seen in FIG. 2). In the presently preferred embodiment, the biasing means takes the form of a coil spring 80 disposed within the bore 22 and sandwiched between the end of the holder-mounting shaft portion 54 and a set screw 82 threaded into the outermost portion of bore 22, which is internally threaded so as to receive the set screw 82. The coil spring 80 therefore resiliently biases and spring-loads the entire support means 24 toward the worm or lead screw 42, forcing the live center 74 into the conical recess 78 in the end of the lead screw and biasing the lead screw toward the stepper motor 34 along substantially its entire length in one axial direction. This spring biasing forces the sharp point, tip or apex 74 of the live center 52 into the free end 46 of the lead screw, supporting the latter and also serving to take up any "play" encountered in the stepper motor as in the bearings which support the lead screw in the motor. This helps to ensure accurate recorder head positioning, since its lead screw is always biased toward the same position and cannot shift longitudinally upon a change in drive direction. In operation, the stepper motor (which may be of a conventional type having a 15° step, for example) rotates the output shaft or lead screw 42. The live center 52 will then rotate with the lead screw, on bearing 62, moving relative to the holder 50.

The lead screw and lead screw mounting structure in accordance with the present invention greatly facilitates use of a stepper motor having an integral worm or lead screw-type output shaft in flexible disc recorders, and in a larger sense, may be used to facilitate use of any similarly cantilevered drive shaft in any given application, whether a lead screw or other rotary shaft used with a stepper motor or other type of motor or drive element, particularly where extremely accurate positioning is a primary consideration. The live center 52 securely supports the free end of the lead screw and prevents misalignment of the lead screw during operation. During assembly, the lead screw 42 is inserted through the bore 32, which has a diameter greater than that of the lead screw. The motor is positioned coaxially of the bore 32 through adjustment of the mounting clips 36. The free end 46 of the lead screw is positioned coaxially with and on the tip 74 of the live center at the seat 78. Due to the mating configuration of the tip 74 and seat 78, the free end of the lead screw is securely supported. The coil spring 80, the presently preferred form of biasing means, ensures that any play or excess clearance in the bearings is taken up, and that the free end of the worm is properly supported by the live center. Adjustment of the set screw 82 permits adjustment of the initial pre-load on the lead screw 42.

The present invention, therefore, provides an economical lead screw drive for a flexible disc recorder which ensures accurate alignment and stable positioning of the lead screw, and thus of the recording heads, relative to the frame. The present invention eliminates the need for separately or independently mounting the lead screw and coupling it to a stepper motor through an intermediate member. At the same time, this arrangement reduces the difficulty and expense of assembly of the lead screw drive, and results in a highly desirable cost economies.

In view of the foregoing description, various modifications to the present invention may now become apparent to those of ordinary skill in the art without departing from the inventive concepts disclosed herein. For example, biasing means other than the coil spring 80 illustrated could be employed to bias the support 24 against the free end 46 of the lead screw. Further, the specific nature and shape of the support and other elements of the invention could be other than as specifically illustrated. It is therefore expressly intended that the above description should be considered as that of the preferred embodiment only. The true spirit and scope of the present invention will be determined by reference to the appended claims.

The embodiments of the invention in which an exclusive property or privilege is claimed are defined as follows.

1. An improved lead screw drive for a disc recorder comprising:
   a rigid frame having a pair of mutually spaced and oppositely-disposed rigid frame members, one of said frame members defining a first mount and the other of said frame members defining a second mount facing said first mount, said mounts being coaxially aligned with each other;
   a motor secured to said one of said mounts and having an output shaft;
   a lead screw secured rigidly to and extending coaxially from said motor output shaft towards said second mount, said lead screw having a free end and defining a seat at such end of the screw;
   support means disposed at said second mount and having portions extending therefrom to contact the free end of said lead screw opposite said motor, for supporting said lead screw at said free end, said support means including a bearing support hub;
   a bearing disposed within said support hub;

a convergingly tapered member rotatably supported upon a fixed axis of rotation by said bearing and bearing support hub, said tapered member extending cantilevered from said other frame member and toward the free end of said lead screw along the axis of the lead screw, said tapered member having an apex contacting the seat of said lead screw; and biasing means for biasing said tapered member into engagement with said lead screw seat to rotatably support the free end of the lead screw from said other frame member.

2. An improved lead screw drive as defined by claim 1 wherein said tapered member includes a hub portion rotatably supported by said bearing and wherein said tapered member terminates at said apex in a conical end engaging said lead screw along the longitudinal centerline of said lead screw.

3. An improved lead screw as defined by claim 1 wherein said biasing means includes an adjustable element carried on said other frame member and having a plurality of different selectable fixed positions relative thereto for acting on the biasing means to vary the bias force applied thereby to said tapered member which forces the same into engagement with said lead screw seat.

4. An improved lead screw as defined by claim 3 wherein said second mount includes an opening formed in said other of said rigid frame members and threaded along at least a portion of the inner peripheral surface thereof, and wherein said biasing means comprises:

a coil spring disposed within said opening and engaging said tapered member to push the same toward and against the lead screw seat; and an externally threaded member threaded into said opening and engaging said coil spring at the end thereof opposite said tapered member, to compress the spring between the threaded member and the tapered member and thereby set the biasing force acting on the tapered member.

5. In a data recorder/reproducer of the type using a disc recording media and including a transducer movable along the disc, an improved drive means for moving the transducer along the disc, said improved drive means including:

a rigid frame defining first and second mutually spaced and axially aligned openings and a motor mount, said motor mount disposed at the second opening and spaced from and coaxially aligned with said first opening;

an integral lead screw and stepper motor unit, said lead screw extending coaxially from said stepper motor and comprising the output shaft thereof, said stepper motor secured to said motor mount and said lead screw extending away from said second opening and toward said first opening, said lead screw having a free outboard end positioned adjacent said first opening;

support means at said first opening for supporting the free end of said lead screw, said support means including an elongated guide passage located along the axis of the lead screw and comprising at least part of said first opening, a guide element having portions disposed within said guide passage and slidably guided longitudinally therein along the axis of the lead screw, and a rotatable member supported by said guide element and having a projecting portion directed toward and supportingly engaging the free end of said lead screw at the center thereof, said projecting portion rotating with said lead screw upon rotation thereof, said projecting portion supported by said guide portion so as to have a common axis therewith located by said guide portion and being movable linearly along such axis by longitudinal sliding of the guide portion within the guide passage, and loading means for resiliently loading said rotatable member against said free end of said lead screw and thereby loading said lead screw axially toward said motor.

6. The improvement of claim 1 wherein said support means further includes a bearing holder, said holder comprising a bearing support cup opening towards said lead screw and attached to said guide element.

7. The improvement of claim 5 wherein said rotatable member includes a hub and a conical portion integral with said hub and terminating in a generally pointed configuration at the apex thereof, said support means further including a bearing carried by said bearing support cup and rotatably supporting said hub of said rotatable member.

8. The improvement of claim 7 wherein said loading means comprises:

a coil spring disposed in said first opening and engaging said guide element portion.

9. The improvement of claim 8 further including an adjustably positionable member disposed at least partially within said first opening and engaging said spring for adjusting the initial loading exerted by said rotatable member on said lead screw by said coil spring.

10. The improvement of claim 9 wherein the included angle of said apex of said generally conical portion is approximately 60° and the diameter of said pointed configuration is no greater than about 0.030 inches.

11. The improvement of claim 10 wherein said apex of said conical portion is sharply pointed.

* * * * *